(12) United States Patent
Borcherding

(10) Patent No.: US 10,184,685 B1
(45) Date of Patent: Jan. 22, 2019

(54) AIR VENTILATING UNIT

(71) Applicant: Double L Group, LLC, Dyserville, IA (US)

(72) Inventor: Norbert R. Borcherding, Dyersville, IA (US)

(73) Assignee: DOUBLE L GROUP, LLC, Dyersville, IA (US)

( * ) Notice: Subject to any disclaimer, the term of this patent is extended or adjusted under 35 U.S.C. 154(b) by 0 days.

(21) Appl. No.: 15/403,849

(22) Filed: Jan. 11, 2017

Related U.S. Application Data

(60) Provisional application No. 62/280,014, filed on Jan. 18, 2016.

(51) Int. Cl.
| | |
|---|---|
| *F24F 7/06* | (2006.01) |
| *F24F 13/14* | (2006.01) |
| *F24F 13/15* | (2006.01) |
| *A01K 1/00* | (2006.01) |
| *E04B 1/70* | (2006.01) |
| *E04H 5/08* | (2006.01) |
| *E04H 5/02* | (2006.01) |

(52) U.S. Cl.
CPC ........ *F24F 13/1406* (2013.01); *A01K 1/0052* (2013.01); *A01K 1/0064* (2013.01); *E04B 1/7076* (2013.01); *E04H 5/02* (2013.01); *E04H 5/08* (2013.01); *F24F 13/15* (2013.01)

(58) Field of Classification Search
CPC .. F24F 13/1406; A01K 1/0052; A01K 1/0064
USPC .......................................... 454/369, 284–332
See application file for complete search history.

(56) References Cited

U.S. PATENT DOCUMENTS

| | | | | |
|---|---|---|---|---|
| 2,709,402 | A * | 5/1955 | Malm ....................... | E06B 7/02 454/271 |
| 3,668,999 | A * | 6/1972 | Alley ................... | F24F 13/1426 454/194 |
| 4,481,734 | A * | 11/1984 | Vaida ...................... | E06B 7/086 160/236 |
| 2007/0218828 | A1* | 9/2007 | Baik ..................... | F24F 13/075 454/256 |

* cited by examiner

*Primary Examiner* — Vivek K Shirsat
(74) *Attorney, Agent, or Firm* — Shuttleworth & Ingersoll, PLC; James C. Nemmers

(57) ABSTRACT

An air ventilating unit that assists in exhausting air from a building. The unit has a housing providing an opening to the exterior of the building, the housing having moveable louvers pivotally mounted in the housing with seals between the louvers and between the louvers and the housing to minimize outside air leakage when the louvers are closed. The louvers are designed to prevent them from flipping over and becoming jammed when in an open position. Once the louvers are fully open, all the louvers will stay open with minimal fan power.

12 Claims, 6 Drawing Sheets

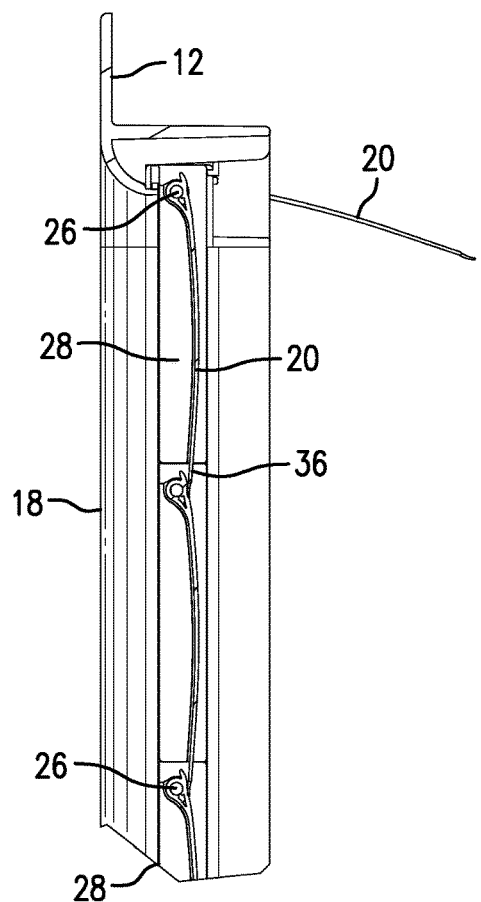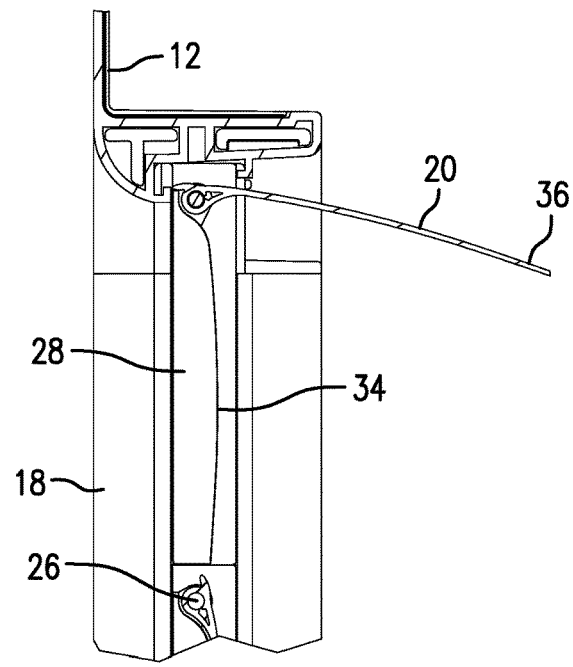
FIG.3  FIG.4
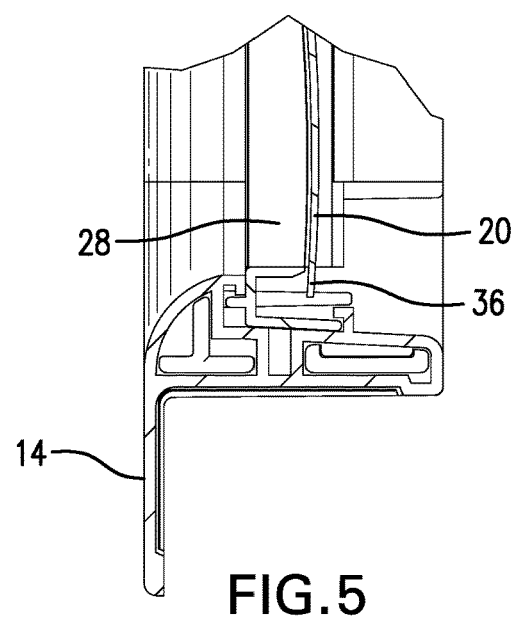
FIG.5

AIR VENTILATING UNIT

This application claims priority under 35 USC 119 to Provisional Patent Application Ser. No. 62/280,014 filed on Jan. 18, 2015, the contents of which are hereby incorporated by reference.

BACKGROUND OF THE INVENTION

Ventilating the interior of buildings is highly desirable and essential wherever living creatures or plants are being maintained. For example, the interior conditions must be controlled in buildings used for warehousing or industrial storage, for the raising of vegetables and plants or for raising poultry or livestock. For those buildings where living creatures are being raised, proper interior ventilation is essential to their good heath. During the winter, buildings will most likely be cool and damp if the building is located in the northern climates. In the summer, the interior of the building will likely be hot and humid. Ventilation is a process to control the temperature, humidity and gases within the building, and with controlled ventilation, an improved environment can be maintained.

An ongoing problem in such buildings is to maintain a proper interior temperature, especially where the building houses livestock or poultry. Excessive heat or cold in the building can adversely affect the health of the live animals being housed. Typically, shutters of various designs are used in cooperation with ventilating fans to exhaust air from the interior of the buildings. However, most traditional shutters allow outside air to leak into the building. Leakage of outside air into the building increases heating costs during cold exterior temperatures, since more fuel is required to maintain a desired condition. During times of extreme high temperatures outside the building, movement of air from the interior of the building is also essential to maintain improved conditions inside the building.

There are known and used numerous designs of air ventilating units that can be mounted on the walls of a building to control the flow of air exiting the building. These units typically contain a shutter unit having pivoted louvers moveable from an open to a closed position. These louvers operate automatically in response to the negative or positive pressure created in the building by exhaust fans. However, with known air ventilating units of the automatic type, the louvers often do not seal completely, thus allowing outside air to leak into the building. Moreover, the louvers sometimes will flutter or flip over and stick open allowing outside air to enter the building. There is therefore a need for an improved air ventilating unit having multiple louvers which when mounted in the wall of the building will provide an airtight unit, resulting in minimal air leakage with minimal heat loss or cold air entering the building where installed.

SUMMARY OF THE INVENTION

The air ventilating unit of the invention will overcome these heat loss issues as well as substantially improve air flow. The air ventilating unit of the invention has a housing that is suitable for mounting in the wall of a building, which housing is provided with an opening to the exterior of the building. Moveable louvers are pivotally mounted in the housing in a way that creates seals between the louvers themselves and the housing in which the louvers are pivotally mounted, thus providing minimal outside air leakage. The combination of the louver edges with the housing also will positively prevent the louvers from flipping over and sticking in an open position. Once the louvers are fully open, all the louvers will stay open with minimal fan power. This design provides more cubic feet per minute of air movement per watt of power, thus producing increased ventilation performance and lower energy usage.

BRIEF DESCRIPTION OF THE DRAWINGS

FIG. 3 is a side sectional view of a part of the upper portion of the air ventilating unit and showing the louvers in a closed position;

FIG. 4 is an enlarged view of the upper portion of FIG. 3 but showing the upper louver open;

FIG. 5 is a an enlarged view of a part of the lower portion of the air ventilating unit;

DETAILED DESCRIPTION OF THE PREFERRED EMBODIMENTS OF THE INVENTION

Figure 1:
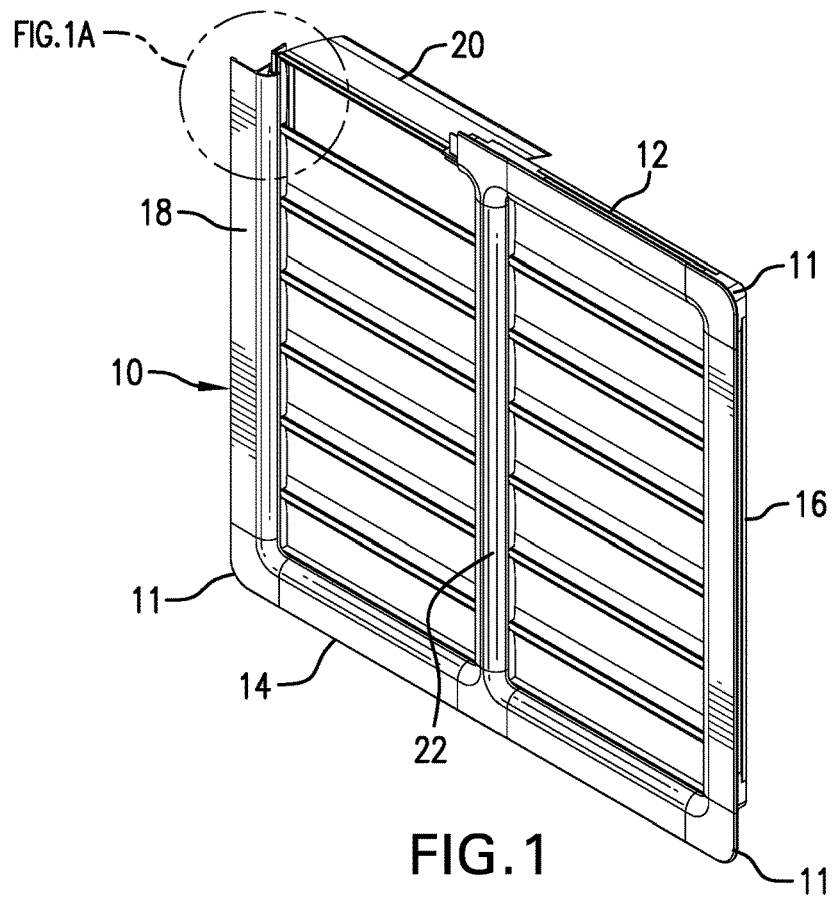
FIG. 1 is a perspective view of an air ventilating unit constructed according to the principles of the invention, viewing the unit as it would appear from the right when inside of a building where it is installed, the view also showing a single louver in the open position.
Figure 1A:
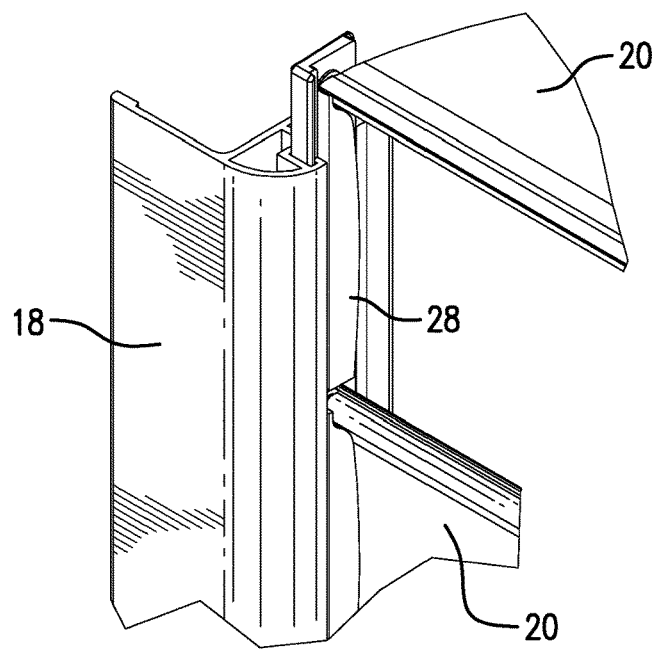
FIG. 1A is an enlarged view of a portion of the upper left corner of the air ventilating unit of FIG. 1.
Figure 2:
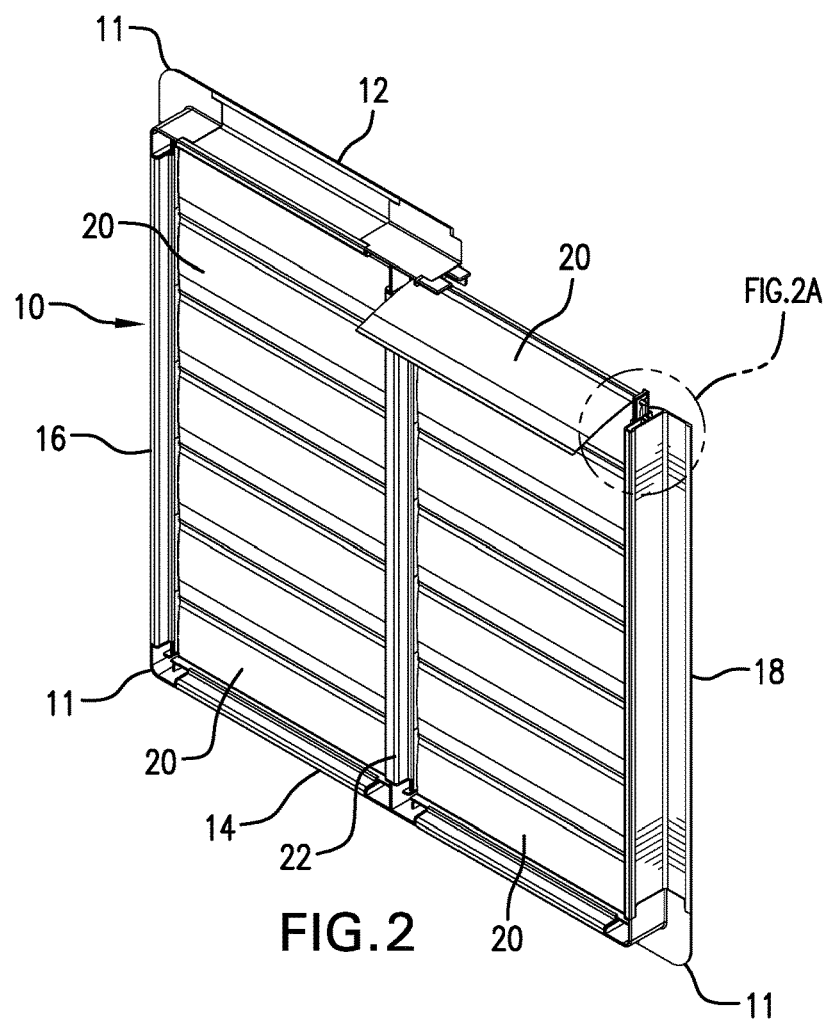
FIG. 2 is a perspective view of the air ventilating unit of FIG. 1, but viewing the unit as it would appear from the right when outside of a building, the view also showing a single louver in the open position.
Figure 2A:
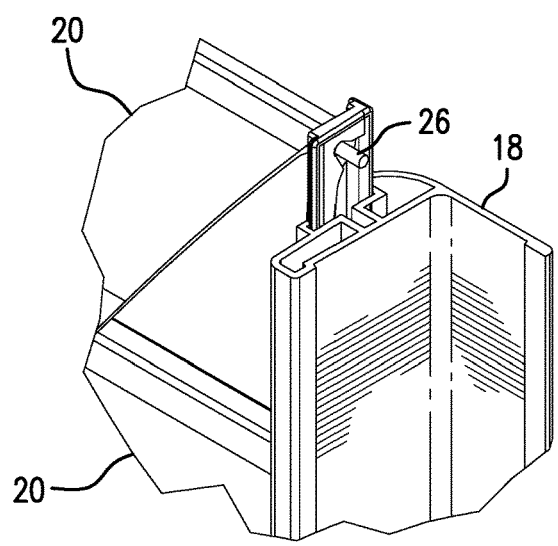
FIG. 2A is an enlarged view of a portion of the upper right corner of the unit of FIG. 2.

Referring first to FIGS. 1 and 2, the basic air ventilating unit of the invention is comprised of a rectangular frame 10 having corner pieces 11 that connect the frame members and hold them together so that the frame 10 can be used to install the ventilating unit of the invention in an opening in the wall of a building to be ventilated. As is well known to those skilled in the art, the air ventilation unit is combined with an exhaust fan (not shown) which, when on, will draw air from the inside of the building and exhaust the air outside. FIG. 1 shows the inside face of the unit at it would appear when viewed from inside of the building where installed, and FIG. 2 shows the outside face which faces the exhaust fan. The frame 10 provides for installing the unit in the opening of a building in any suitable manner, and frame 10 includes a top member 12, a bottom member 14 and two side members 16 and 18 that comprise the mounting structure for a plurality of louvers or louvers 20. Each louver 20 has a top edge, a bottom edge and outer ends. FIGS. 1A and 2A of the drawings show one of the corner pieces 11 and a portion of the top member 12 cut away to better illustrate the construction of the unit. Enclosed within the mounting structure of frame 10 are two sections of vertically overlapping louvers 20, with each section separated by a vertical center member 22. In the manner described in detail hereinafter, each louver 20 is pivotally mounted at its ends to one of the side members 16 or 18 and to one side of the center member 22. It should be understood that the louvers 20 can be mounted between the side members 16 and 18 without the use of a center member 22, or more than one center member 22 can be used with a set of louvers 20 mounted between two center members 22. The use of one or more center members depends upon the size of the air ventilating unit designed for a specific installation. The members 12, 14, 16, 18 and 22 have rounded inside edges as shown in the drawings. These edges facilitate the flow of air into and through the ventilating unit of the invention.

Figure 6:
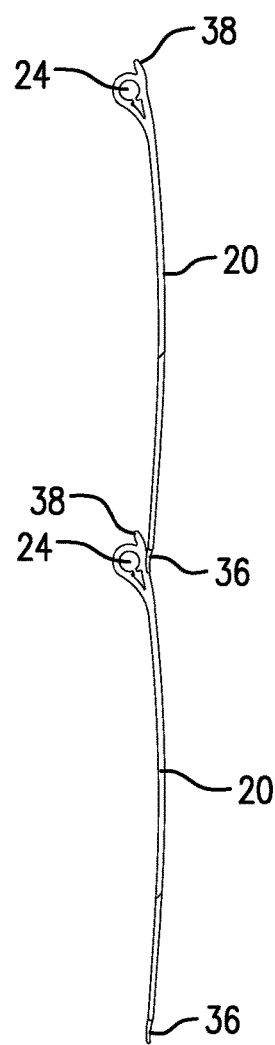
FIG. 6 is an end view of two louvers to illustrate the overlap and seal between the louvers.

As best seen in FIGS. 4 and 6, each louver 20 is formed into an aerodynamic shape resembling the curved top surface of the wing of an aircraft. Along the top edge of the louver 20 is a longitudinally extending opening 24 for receiving a pivot pin 26 that provides for attaching each louver 20 within the frame 10. It will be understood that pivot pins 26 can be formed as a part of each louver 20 near its upper edge, or the pins 26 can be separate, which would provide for more efficient customized manufacture of the louvers 20 to fit frames 10 in which the opening provided by the frame 10 varies.

Figure 7:
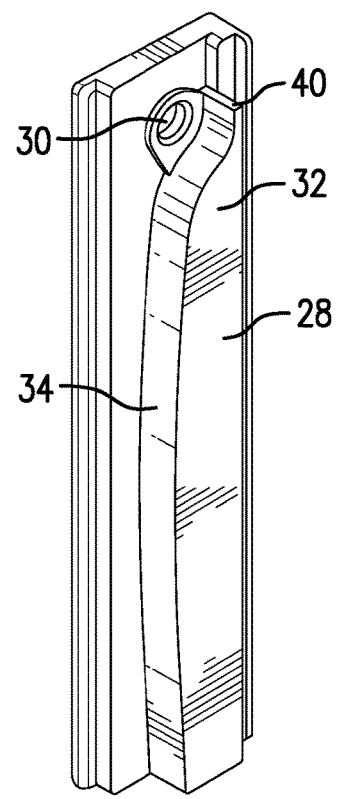
FIG. 7 is a perspective view of an adapter clip into which each louver is mounted.
Figure 8:
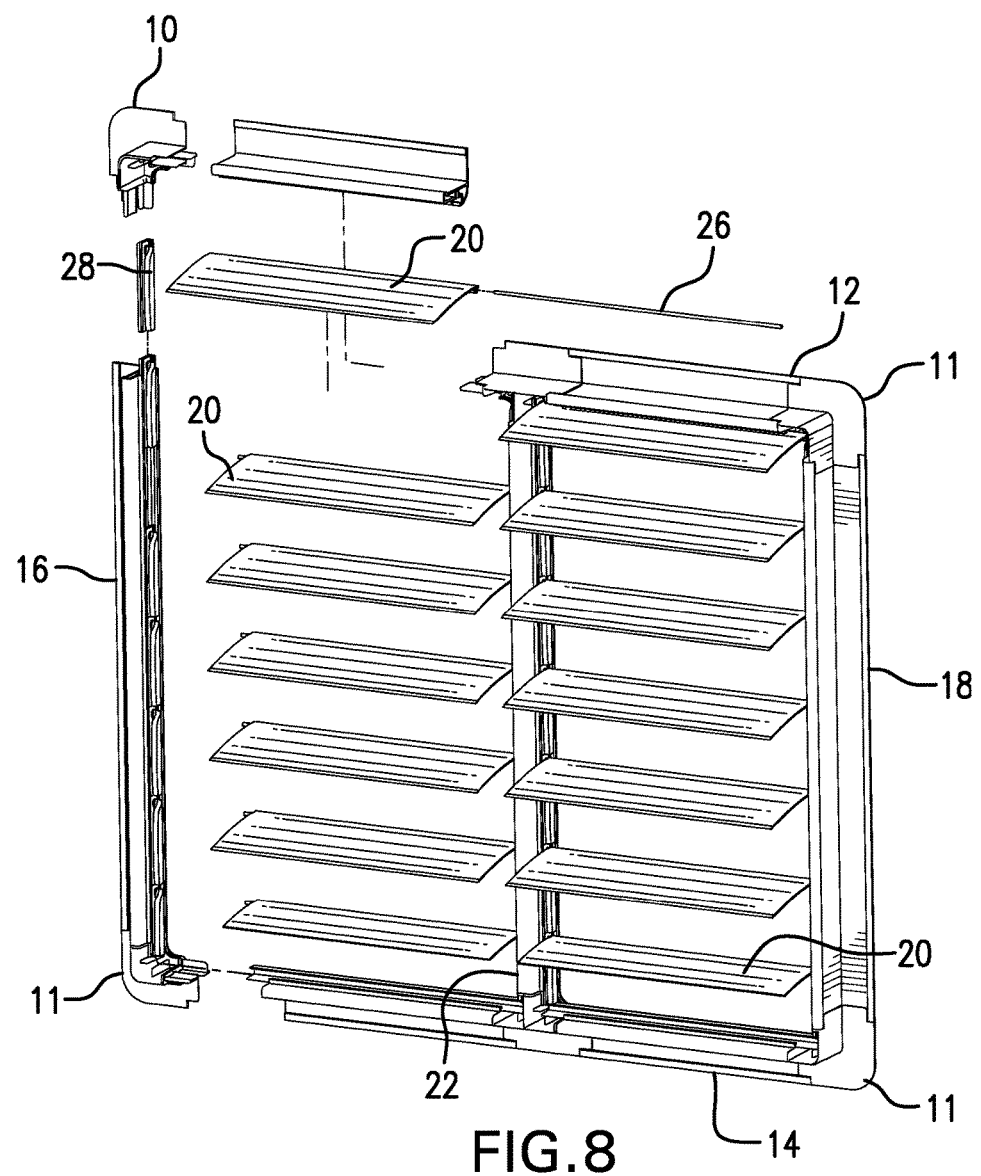
FIG. 8 is an exploded view of the air ventilating unit of the invention, viewing the unit from a right angle as it would appear from outside of building where the unit is installed.
Figure 9:
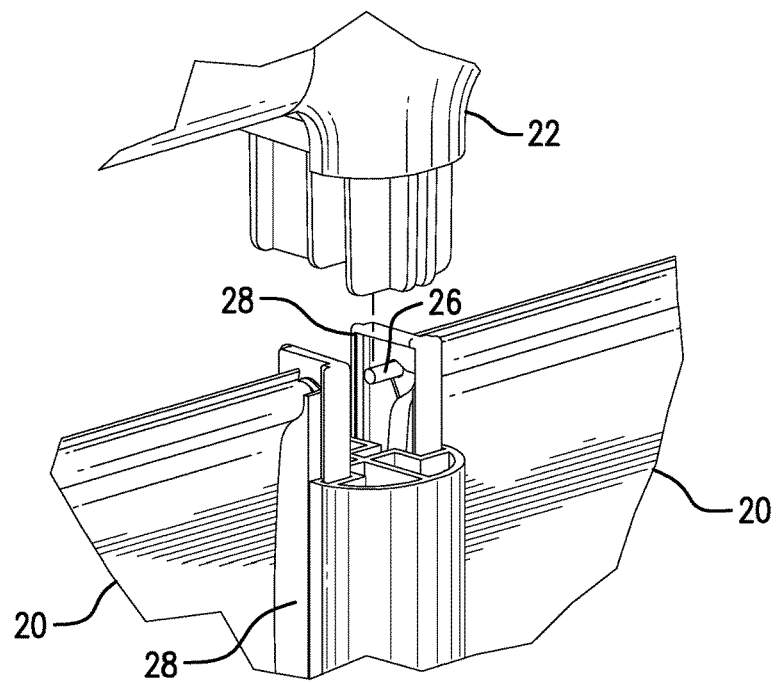
FIG. 9 is an enlarged partially exploded perspective view of a portion of the upper center member of the unit.
Figure 10:
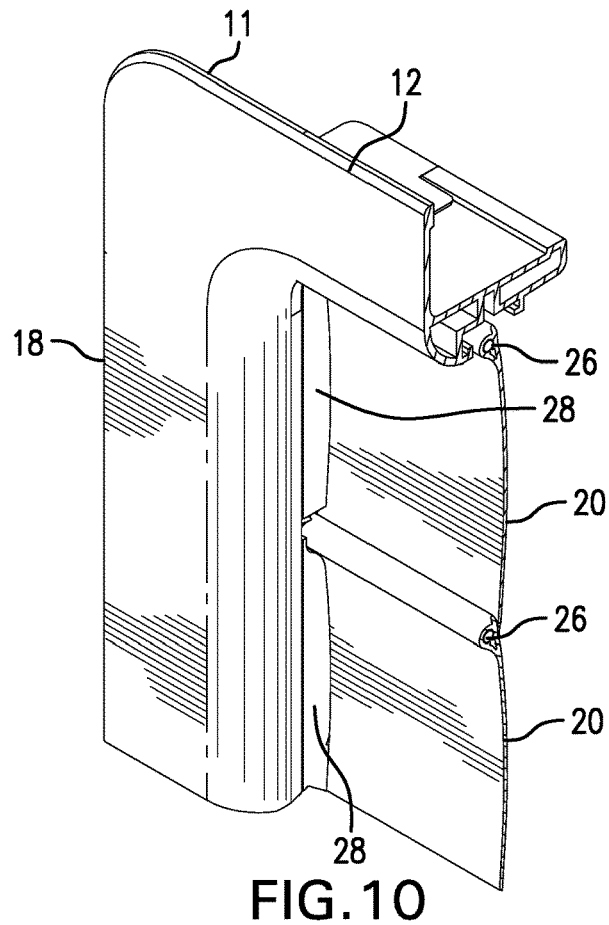
FIG. 10 is a perspective view partly in section of the upper left corner of the unit when viewed from inside of the building where the unit is installed.

Along the inside of the side members 16 and 18 and the inside edges of the center member 22 are attached adapter clips 28, one for each louver 20. As best seen in FIG. 7, adapter clip 28 has an opening 30 for receiving the end of a pivot pin 26. Adjacent the opening 30, adapter clip 28 has a stop 32 that has a downwardly curved surface 34 the curvature of which corresponds to the curved shape of the louver 20. The stop 32 extends inwardly a sufficient distance to engage the surface along the outer end of a louver 20 when the louver 20 is pivotally mounted with the end of pivot pin 26 extending into the opening 30 and with the louver 20 in a closed position. As best seen in FIG. 10, the engagement of the outer end of the louver 20 with the surface 34 provides for a tight seal when the louvers 20 are closed, thus minimizing any leakage of outside air into the building when the exhaust fan is operating. In addition, as best seen in FIGS. 4 and 6, each louver 20 has a sealing strip 36 extending along the entire bottom edge of the louver 20, which strip 36 overlaps the upper edge of the adjacent louver 20 to provide a seal. As shown in FIG. 5, the strip 36 on the lowest louver 20 engages the inside edge of the bottom frame member 14 to provide a seal.

As best seen in FIGS. 4, 6 and 7, each louver 20 has an upwardly extending tab 38 that preferably extends along the entire top edge of the louver 20. As shown in FIGS. 4A and 7, tab 38 engages the top edge 40 of the adapter clip 28 when the louver 20 is moved to an open position by the exhaust fan. Limiting the amount of open movement of louvers 20 prevents a louver from becoming entangled with an adjacent louver in its section. Entanglement of louvers keeps them from closing completely when the exhaust fan is turned off which is a problem since it allows outside air to enter the building.

The foregoing described structure is unique in providing aerodynamic shaped louvers 20. These louvers 20, when in a normally closed position, will seal tightly against each other and against the adapter clips 28, and the louvers 20 will remain closed and not open until fan power is applied. When fans within the building are turned on, negative pressure will pull the louvers 20 open. Because of their design, the louvers 20 will not flutter, nor will they flip over and stick open which would allow cold air to leak into the building and increase energy bills. The louvers 20 will stay open with minimal fan power. This means increased ventilation performance efficiency. The components of unit of the invention facilitate customized design of the unit to fit any sized opening in a building with easy assembly regardless of the size.

Having thus described the invention in connection with the preferred embodiments thereof, it will be evident to those skilled in the art that various revisions can be made to the preferred embodiment described herein without departing from the spirit and scope of the invention.

The invention claimed is:

1. An air ventilating unit for use in a building in combination with a fan that provides air flow from the interior of the building to the exterior of the building, said unit comprising:
   a frame suitable for mounting the unit in the wall of the building, the frame having an opening providing communication to the exterior of the building and having a top member, a lower member and side members extending between the top member and the lower member;
   a plurality of louvers each having a top edge, a bottom edge and outer ends;
   each louver being pivotally mounted at its outer ends between the side members of the frame so as to be moveable from an open position to a closed position where the bottom edge of a louver engages the top edge of next lower louver;
   each louver having a curved aerodynamic shape and having pivot pins pivotally mounting the louver at its top edge;
   the louvers being normally in the closed position but moving to the open position solely in response to pressure changes created by a fan in the building so that the louvers will open and close in response to the pressure changes between the interior and exterior of the building created by the fan; and
   adapter clips positioned along the side members of the frame each adapter clip having an opening to receive a pivot pin, the adapter clips being combined with the outer ends of each louver, each adapter clip extending inwardly from the pivot pin opening to form a curved sealing surface corresponding to the curved shape of the louvers, the sealing surfaces of the adapter clips being engageable with the outer ends of the louvers to provide a seal to prevent outside air passing between the louvers and the frame when the louvers are in a closed position.

2. The air ventilating unit of claim 1 in which there is at least one vertical center member between the side members of the frame, the center member dividing the opening provided by the frame into sections, each containing a plurality of louvers.

3. The air ventilating unit of claim 1 in which a sealing strip extends along the bottom edge of each louver, the sealing strip engaging the top edge of the next lower louver to provide a seal between louvers.

4. The air ventilating unit of claim 1 in which the adapter clips each have a top edge above and extending inwardly from the pivot pin opening, and each louver has a tab extending upwardly and along its entire top edge, the tab being engageable with the top edge of the adapter clip at the outer ends of the louvers to limit movement of the louvers from a closed to an open position.

5. The air ventilating unit of claim 1 in which the side members of the frame have rounded interior edges to facilitate the flow of air through the opening of the frame.

6. The air ventilating unit of claim 1 in which the pivot pins are integral with the louvers.

7. The air ventilating unit of claim 1 in which the pivot pins are separable from the louvers.

8. The air ventilating unit of claim 2 in which a sealing strip extends along the bottom edge of each louver, the sealing strip engaging the top edge of the next lower louver to provide a seal between louvers.

9. The air ventilating unit of claim 2 in which the adapter clips each have a top edge above and extending inwardly from the pivot pin opening, and each louver has a tab extending upwardly and along its entire top edge, the tab being engageable with the top edge of the adapter clip at the outer end of each louver to limit movement of the louvers from a closed to an open position.

10. The air ventilating unit of claim 2 in which the side members and vertical members of the frame have rounded interior edges to facilitate the flow of air through the opening of the frame.

11. The air ventilating unit of claim 2 in which the pivot pins are integral with the louvers.

12. The air ventilating unit of claim 2 in which the pivot pins are separable from the louvers.

* * * * *